United States Patent
Asada

[11] Patent Number: 6,050,611
[45] Date of Patent: Apr. 18, 2000

[54] COMMON RAIL

[75] Inventor: Kikuo Asada, Mishima, Japan

[73] Assignee: Usui Kokusai Sangyo Kaisha Limited, Japan

[21] Appl. No.: 09/028,703

[22] Filed: Feb. 24, 1998

[30] Foreign Application Priority Data

Mar. 4, 1997 [JP] Japan ................................. 9-65461

[51] Int. Cl.⁷ .................................................. F16L 41/08
[52] U.S. Cl. ........................ 285/133.4; 285/189; 285/197; 285/288.1; 285/906
[58] Field of Search ..................................... 285/197, 198, 285/199, 906, 133.11, 133.4, FOR 138, 189, 288.1; 123/470

[56] References Cited

U.S. PATENT DOCUMENTS

| | | | |
|---|---|---|---|
| 315,074 | 4/1885 | Root | 285/133.11 |
| 1,246,456 | 11/1917 | Parpert . | |
| 1,264,854 | 4/1918 | Possons . | |
| 1,336,423 | 4/1920 | Chadwick | 285/198 |
| 1,476,756 | 12/1923 | Junkers . | |
| 1,519,010 | 12/1924 | Reznor . | |
| 1,545,493 | 7/1925 | Hoffman | 285/198 |
| 1,841,879 | 1/1932 | Croxford . | |
| 2,041,209 | 5/1936 | Ridley . | |
| 2,426,106 | 8/1947 | Kinley . | |
| 2,859,870 | 11/1958 | HItz . | |
| 3,068,029 | 12/1962 | Schwartz . | |
| 3,082,850 | 3/1963 | Weening . | |
| 3,094,137 | 6/1963 | Burke . | |
| 3,259,003 | 7/1966 | Griffin . | |
| 3,277,683 | 10/1966 | Knoblock . | |
| 4,129,028 | 12/1978 | Leftheris et al. . | |
| 4,364,406 | 12/1982 | Bohlin . | |
| 4,399,829 | 8/1983 | Schuler . | |
| 4,680,845 | 7/1987 | Miller . | |
| 4,741,081 | 5/1988 | Redman . | |
| 4,832,376 | 5/1989 | Sugao . | |
| 4,893,601 | 1/1990 | Sugao . | |
| 4,900,180 | 2/1990 | Takikawa . | |
| 4,953,896 | 9/1990 | Usui | 285/197 |
| 4,979,295 | 12/1990 | Stagni et al. . | |

(List continued on next page.)

FOREIGN PATENT DOCUMENTS

| | | | |
|---|---|---|---|
| 806413 | 12/1936 | France . | |
| 506067 | 1/1957 | Italy | 285/197 |
| 2-80289 | 6/1990 | Japan . | |
| 3-177693 | 8/1991 | Japan . | |
| 4-175462 | 6/1992 | Japan . | |
| 88663 | 7/1958 | Netherlands . | |
| 659623 | 10/1951 | United Kingdom | 285/197 |
| 836524 | 6/1990 | United Kingdom . | |

*Primary Examiner*—Dave W. Arola
*Attorney, Agent, or Firm*—Anthony J. Casella; Gerald E. Hespos; Michael J. Porco

[57] ABSTRACT

There is provided a common rail which can reduce a maximum stress value generated in an inner peripheral edge portion of a lower end of a branch hole and can further improve an internal pressure fatigue strength. In the common rail comprising at least one branch hole provided on a peripheral wall portion of a main pipe rail having a communication passage inside an axial core, a pressure receiving seat surface communicating with a branch pipe having a communication passage communicating with the communication passage in a peripheral surface portion of the branch hole and open to an outer portion, thereby bringing a pressing seat surface portion constituted by a connection head portion disposed in an end portion of the branch pipe into contact and engaging therewith, and a joint portion integrally or separately provided in the main pipe rail and a nut previously assembled in the branch pipe end which are meshed with each other so as to be pressed under a neck portion of the connection head portion, thereby being fastened and connected, the main pipe rail has an outer peripheral surface substantially formed in a circular shape, and at least an adjacent portion to the branch hole of the inner peripheral surface is slightly projected or flattened so as to be formed in a vertical cross section of a not complete round shape.

8 Claims, 11 Drawing Sheets

U.S. PATENT DOCUMENTS

| | | |
|---|---|---|
| 5,072,710 | 12/1991 | Washizu . |
| 5,120,084 | 6/1992 | Hashimoto . |
| 5,136,999 | 8/1992 | Bassler et al. . |
| 5,143,410 | 9/1992 | Takikawa . |
| 5,169,182 | 12/1992 | Hashimoto . |
| 5,172,939 | 12/1992 | Takikawa . |
| 5,192,026 | 3/1993 | Rix et al. . |
| 5,265,456 | 11/1993 | Kennedy et al. . |
| 5,667,225 | 9/1997 | Kato . |
| 5,887,910 | 3/1999 | Usui . |
| 5,957,507 | 9/1999 | Asada . |

PRIOR ART

PRIOR ART

PRIOR ART 6,050,611

COMMON RAIL

BACKGROUND OF THE INVENTION

1. Field of the Invention

The present invention generally relates to a common rail such as a high pressure fuel manifold in a diesel engine or a block rail.

2. Description of the Prior Arts

Conventionally, various kinds of common rails of this type having various kinds of shapes have been suggested. For example, as shown in FIGS. 8 and 9, there has been known a so-called boss type common rail which is structured such that a branch hole communicating with a communication passage 11-1 of a main pipe rail 11 and having a pressure receiving seat surface 11-4 open to an outer direction is pierced in a plurality of boss portions 11-3 disposed in an axial peripheral wall portion of the main pipe rail 11 having an outer peripheral surface formed in a complete round shape at an interval, a pressing seat surface 12-3 formed by a connection head portion 12-2 of a branch pipe 12 end is brought into contact and engaged with the pressure receiving seat surface 11-4 of the main pipe rail 11 end, and a fastening outside screw nut 13' or a ball head lock nut 13" previously assembled in the branch pipe end is meshed with an inside screw or an outside screw disposed on an inner peripheral surface or an outer peripheral surface of the boss portion 11-3, so that the common rail is fastened and connected together with pressing under a neck portion of the connection head portion 12-2. In FIGS. 8 and 9, reference numeral 12-1 denotes a flow passage of the branch pipe 12, reference numeral 14' denotes a fastening sleeve washer and reference numeral 14", denotes a washer.

Further, as shown in FIG. 10, there has been known a so-called sleeve nipple type common rail which is structured such that a branch hole 11-4 portion communicating with an inner communication passage 11-1 disposed in a peripheral wall portion of a main pipe rail 11 end constituted by a circular pipe is made a pressure receiving seat surface 11-4 open to an outer direction, a cylindrical sleeve nipple 15 is mounted to an outer peripheral wall of the main pipe rail 11 adjacent to the pressure receiving seat surface by welding, and a pressing seat surface 12-3 constituted by a connection head portion 12-2 of a branch pipe 12 end is brought into contact and engaged with the pressure receiving seat surface 11-4 of the main pipe rail 11, thereby fastening and connecting together with pressing under the connection head portion 12-2 neck by means of an engagement between the inner screw disposed on the inner peripheral surface of the sleeve nipple 15 and the fastening nut 13' previously assembled in the branch pipe end.

Still further, as shown in FIG. 11, there has been known a so-called joint metal fitting type common rail which is structured such that a branch hole 11-2 portion communicating with an inner communication passage 11-1 disposed in a peripheral wall portion of a main pipe rail 11 end constituted by a circular pipe is made a pressure receiving seat surface 11-4 open to an outer direction, and pressing seat surface 12-3 constituted by a connection head portion 12-2 of a branch pipe 12 having a tapering conical shape and enlarged a diameter thereof by buckling is brought into contact and engaged with an end portion by using a ring-like joint metal fitting 16 surrounding an outer peripheral portion of the main pipe rail 11 adjacent to the pressure receiving seat surface, thereby fastening and connecting to a screw wall 16-1 portion projecting to the joint metal fitting 16 together with pressing under the connection head portion 12-2 neck by means of an engagement between a fastening sleeve washer 14' and a fastening nut 13' previously assembled in the branch pipe end.

However, in the case of the boss type common rail which is structured such that the branch hole 11-2 is provided in the boss portion 11-3 integrally formed in the main pipe rail 11 having the outer peripheral surface of a complete round shape, as shown in FIGS. 8 and 9, the sleeve nipple type common rail which is structured such that the cylindrical sleeve nipple 15 is directly mounted to the main pipe rail 11 by welding and the nut 13' meshed with the sleeve nipple 15 is fastened and connected, as shown in FIG. 10, and the joint metal fitting type common rail which is structured such that the ring-like joint metal fitting 16 is outwardly fitted to the main pipe rail 11 and the nut 13' meshed with the ring-like joint metal fitting 16 is fastened and connected, as shown in FIG. 11, a great stress is generated in an inner peripheral edge portion P of a lower end of the branch hole 11-2 due to an axial force applied to the pressure receiving seat surface 11-4 together with the internal pressure of the main pipe rail 11 and the pressing of the connection head portion 12-2 in the branch pipe 12, so that a crack is easily generated with starting from the lower end inner peripheral edge portion P and there is a possibility of inviting a leakage.

SUMMARY OF THE INVENTION

The present invention is made so as to solve the conventional problems mentioned above, and an object of the invention is to provide a common rail which can reduce a maximum stress value generated in an inner peripheral edge portion of a lower end of a branch hole and can further improve an internal pressure fatigue strength.

In order to achieve the object mentioned above, in accordance with the invention, there is provided a common rail comprising a least one branch hole provided on the wall portion of a main pipe rail having a communication passage inside an axial core, a pressure receiving seat surface communicating with a branch pipe having a communication passage communicating with the communication passage in a peripheral surface portion of the branch hole and open to an outer portion, thereby bringing a pressing seat surface portion constituted by a connection head portion disposed in an end portion of the branch pipe into contact and engaging therewith, and a joint portion integrally or separately provided in the main pipe rail and a nut previously assembled in the branch pipe end which are meshed with each other so as to be pressed under a neck portion of the connection head portion, thereby being fastened and connected, in which the main pipe rail has an outer peripheral surface substantially formed in a circular shape, and at least an adjacent portion to the branch hole of the inner peripheral surface is slightly projected or flattened so as to be formed in a vertical cross section of a not complete round shape.

In accordance with the invention, there is provided a common rail in which the main pipe rail totally has a vertical cross section substantially formed in a circular shape, and only an inner peripheral surface adjacent to the branch hole has a cross section formed in a not complete round shape.

In accordance with the invention, the structure that the main pipe rail has an outer peripheral surface substantially formed in a circular shape, and at least an adjacent portion to the branch hole of the inner peripheral surface is slightly projected or flattened so as to be formed in a vertical cross section of a not complete round shape, and that the main pipe rail totally has a vertical cross section substantially formed in a circular shape, and only an inner peripheral surface adjacent to the branch hole has a cross section formed in a not complete round shape is provided on the basis of a lot of experiments repeatedly performed by the inventors.

Accordingly, the inventors have examined a stress concentration portion and a maximum stress value at a time of applying an internal pressure to each of the common rails in the case of using the common rail having a vertical cross section of a complete round shape and the common rail having an outer peripheral surface of a-complete round shape and an inner peripheral surface adjacent to the branch hole slightly projected or flattened so as to have a vertical cross section of a not complete round shape, of providing the branch hole having a cross section of a complete round shape in the main pipe rail and of providing the pressure receiving seat surface in the open end portion of the outer peripheral end of the main pipe rail in the branch hole, for the purpose of reducing the maximum stress value generated in the lower end inner peripheral edge portion P of the branch hole in the main pipe rail.

As a result, in the case of the common rail in which the branch hole having a cross section of a complete round shape is provided in the main pipe rail of the common rail having a vertical cross section of a complete round shape, a great stress is generated in both end portions in an axial direction of the pipe of the opening portion of the branch hole. In contrast with this, in the case of the common rail in which the inner peripheral surface adjacent to the branch hole is slightly projected or flattened so as to be formed in a not complete round shape, the stress is generated in the lower end inner peripheral edge portion of the branch hole in the main pipe rail, however, the stress value has been lower than the stress value of the common rail in which the branch hole having a cross section of a complete round shape is provided in the main pipe rail having a vertical cross section of a complete round shape by a long way.

In accordance with the result mentioned above, in the case of using the main pipe rail in which the inner peripheral surface adjacent to the branch hole is slightly projected or flattened so as to be formed in a not complete round shape, it has been understood that the stress generated in the portion of the branch hole can be reduced. Accordingly, in the case of using the main pipe rail in which the inner peripheral surface adjacent to the branch hole is slightly projected or flattened so as to be formed in a not complete round shape, it is estimated that the stress generated in the portion of the branch hole is reduced at an amount of the stress generated in the lower end inner peripheral edge portion of the branch hole in the main pipe rail.

As mentioned above, in accordance with the invention, since the main pipe rail in which the outer peripheral surface is substantially formed in a circular shape and at least the inner peripheral surface adjacent to the branch hole is slightly projected or flattened so as to be formed in a vertical cross section of a not complete round shape is used, or the main pipe rail in which the total shape is formed in a vertical section of a complete round shape and only the inner peripheral surface adjacent to the branch hole is formed in a cross section of a not complete round shape is used, the stress in the branch hole can be effectively prevented from generating, so that an internal pressure fatigue strength in each of the branch pipe mounting portions can be significantly improved.

DETAILED DESCRIPTION OF PREFERRED EMBODIMENTS

Figure 1:
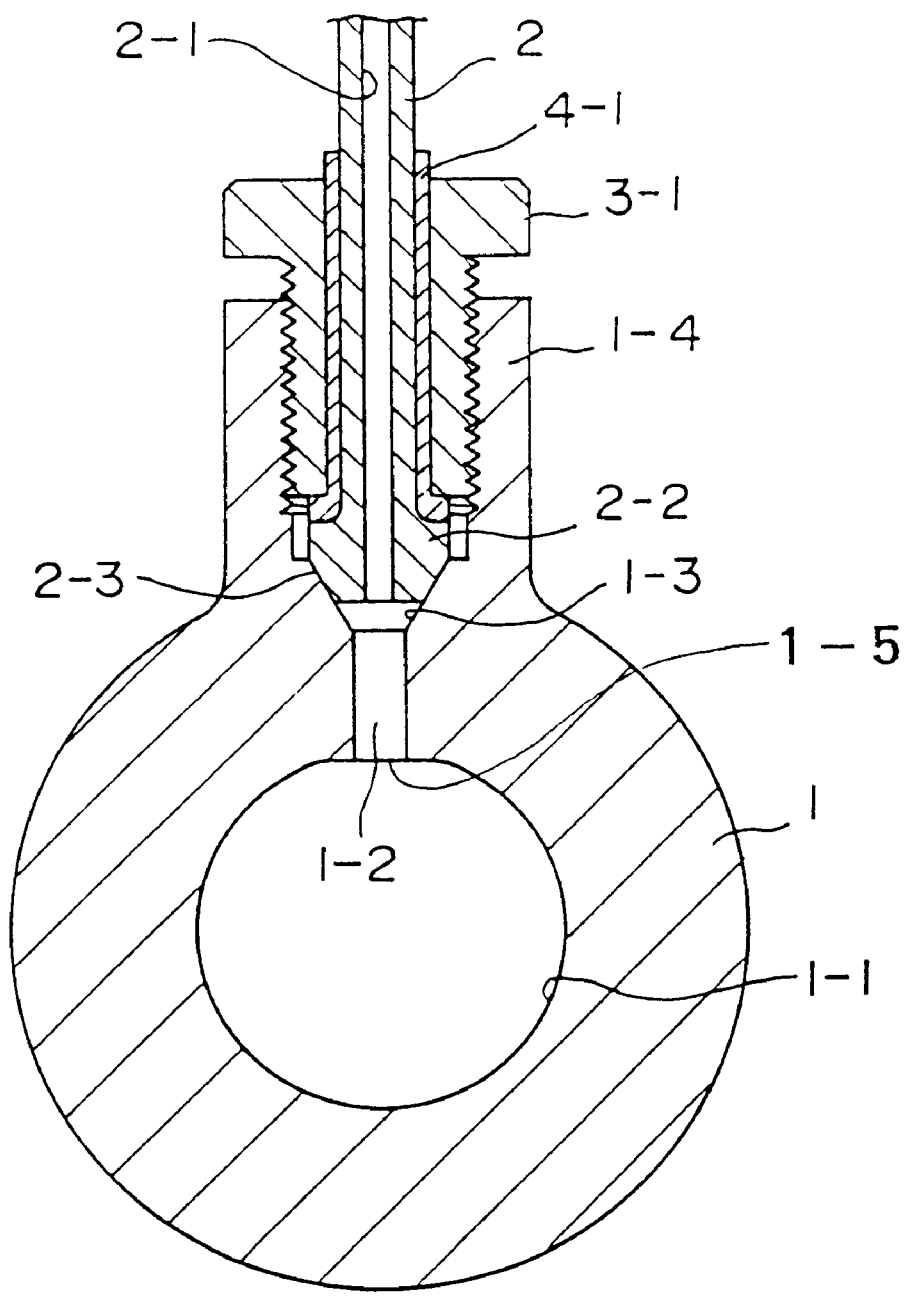
FIG. 1 is a vertical cross sectional view which partially shows an example of a connecting structure of a branch pipe in the case that an embodiment in accordance with the invention is applied to an embodiment of a common rail of a boss type.
Figure 2:
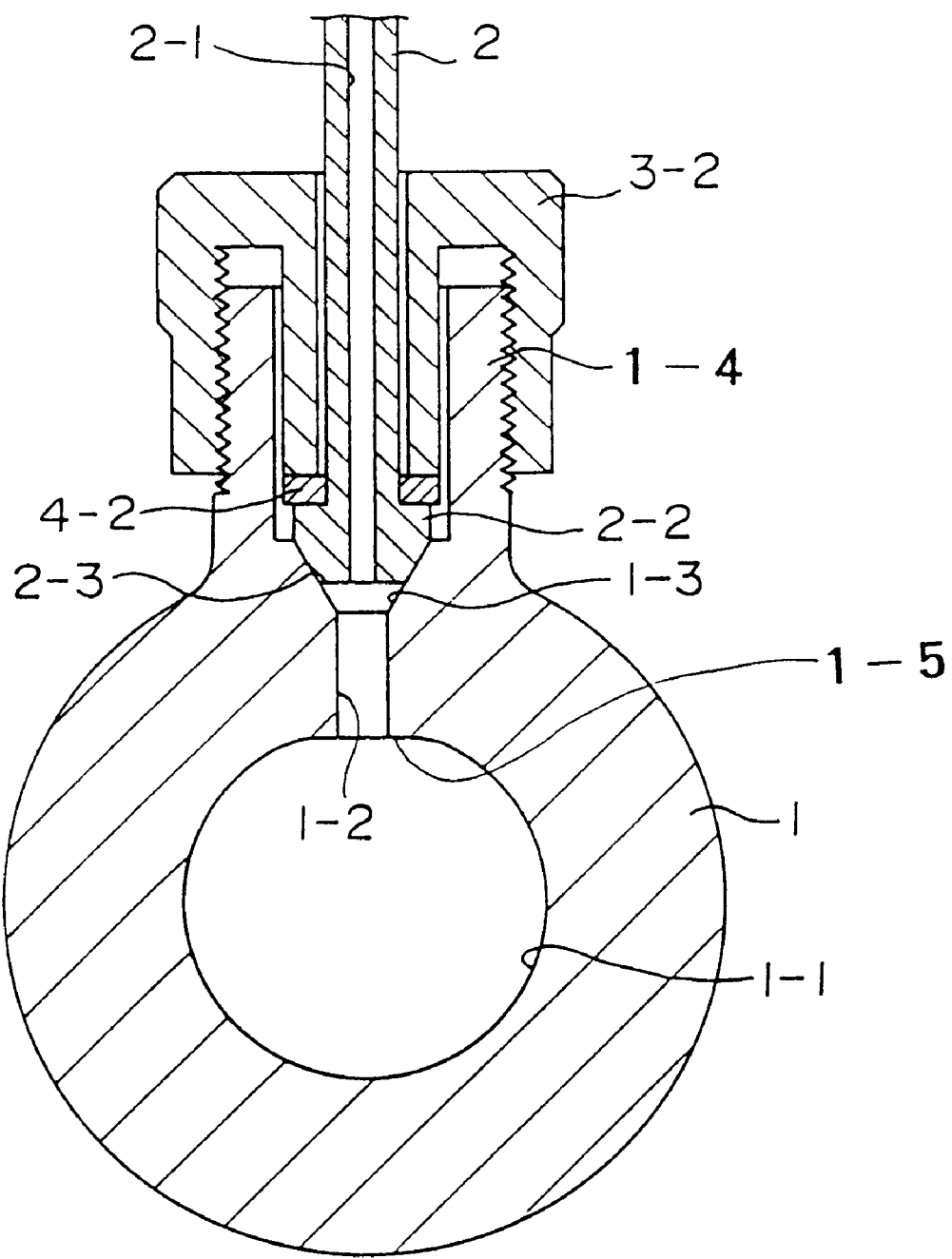
FIG. 2 is a vertical cross sectional view corresponding to FIG. 1 in the case of applying to another embodiment of a boss type common rail.
Figure 3:
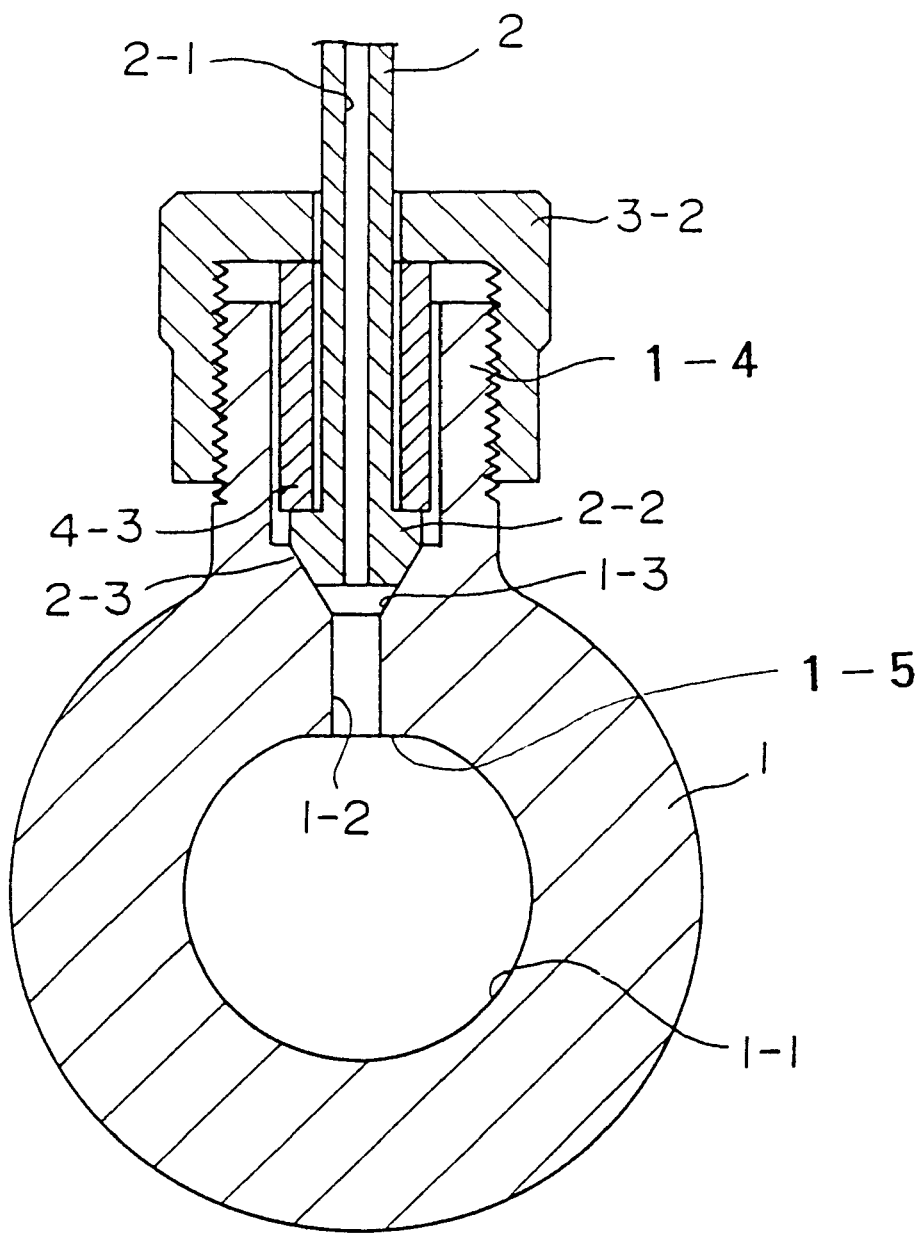
FIG. 3 is a vertical cross sectional view corresponding to FIG. 1 in the case of applying to the other embodiment of a boss type common rail.

The invention will be described below with reference to attached drawings.

In FIGS. 1 to 7, reference numeral 1 denotes a main pipe rail, reference numeral 2 denotes a branch pipe, reference numeral 3-1 denotes a fastening outside screw nut, reference numeral 3-2 denotes a fastening ball head lock nut, reference numeral 4-1 denotes a sleeve, reference numeral 4-2 denotes a washer and reference numeral 4-3 denotes a sleeve washer.

In the case of a boss type, the main pipe rail 1 as a common rail is provided with a boss portion or a plurality of spaced boss portions 1-4 as an integral joint portion formed to have a communication passage 1-1 inside an axial core thereof with an interval in an axial peripheral wall portion by a mechanical processing such as a boring and made by a forging product of a material S45C having a relatively thick pipe-like portion of, for example, a diameter of 28 mm and a thickness of 9 mm, and a branch hole 1-2 having a pressure receiving seat surface 1-3 communicating with the communication passage 1-1 and open to an outer direction is provided in the boss portion.

In this invention, it is important that the main pipe rail 1 has an outer peripheral surface formed substantially in a circular shape and is formed in a vertical cross section of a not complete round shape having a slightly projected or flattened portion in at least the branch hole 1-2 end of the inner peripheral surface in the communication passage 1-1 or flattened. In this case, it is absolutely necessary that the projected or flattened portion 1-5 exists in the branch hole 1-2 end of the inner peripheral surface in the main pipe rail 1, however, it is also understood that the other inner peripheral surface portion has no great relation with prevention of generation of a stress in the branch hole 1-2 portion whether it has a complete round shape or a not complete round shape.

A method of forming the projected or flattened portion 1-5 in the branch hole 1-2 end of the inner peripheral surface in the main pipe rail of the boss type common rail shown in FIGS. 1 to 4 will be described below. In a press molding process, the adjacent portion to the boss portion 1-4 of the main pipe rail is fixed by a female mold. The female mold is constituted by a metal mold formed in a concave cross section and having the same circular arc surface as the outer peripheral surface of the main pipe rail 1, and substantially a lower semicircle of the outer peripheral surface of the main pipe rail 1 is fixed to the female mold in such a manner as to be held. This structure is made for the purpose that the press effect can be sufficiently obtained. After the main pipe rail 1 is fixed to the female mold, a pressing force is applied to an inner bottom portion of the boss portion by a punch having a diameter smaller than an inner diameter of a hole with a bottom cut in the boss portion 1-4 by an end mill and mounted to a press apparatus. By the pressing force at this time, the slightly projected or flattened portion 1-5 is formed in the inner peripheral surface of the communication passage 1-1 of the main pipe rail 1 positioned immediately below the inner bottom portion of the boss portion 1-4.

In this case, it is sufficient that a height of the projected or flattened portion 1-5 is set to be 0.05 to 1.0 mm, however, it is preferable to set a height 1.0 to 2.0 mm. When the height is less than 0.05 mm, generation of a stress in the branch hole portion can not be sufficiently restricted, and on the contrary, when the height is set to be over 2.0 mm, there is no difference in the restriction effect.

On the contrary, the branch pipe 2 is constituted by a branching pipe or a branch metal fitting, and a fluid passage 2-1 communicating with the communication passage 1-1 of the main pipe rail 1 is provided within the branch pipe 2 and a pressing seat surface 2-3, for example, constituted by a connection head portion 2-2 making a diameter large by a bucking formation and having a tapering conical shape is provided in an end portion of the branch pipe 2. In a branch pipe connection structure shown in FIG. 1, the connection structure is made such that the pressing seat surface 2-3 constituted by the connection head portion 2-2 of the branch pipe 2 end is brought into contact with the pressure receiving seat surface 1-3 of the main pipe rail 1 end and a fastening outside screw nut 3-1 previously assembled in the branch pipe end through a sleeve 4-1 is meshed with the boss portion 1-4, thereby being fastened together with pressing of the sleeve 4-1 under the neck of the connection head portion 2-2. Further, in the case of the branch pipe connection structure shown in FIGS. 2 and 3, the connection structure is made such that in the state that the pressing seat surface 2-3 constituted by the connection head portion 2-2 in the branch pipe 2 end is brought into contact and engaged with the pressure receiving seat surface 1-3 in the main pipe rail 1 end, the ball head lock nut 3-2 previously assembled in the branch pipe 2 end through a washer 4-2 or a sleeve washer 4-3 is meshed with the boss portion 1-4, thereby being fastened together with pressing of the washer 4-2 or the sleeve washer 4-3 under the neck of the connection head portion 2-2.

Figure 4:
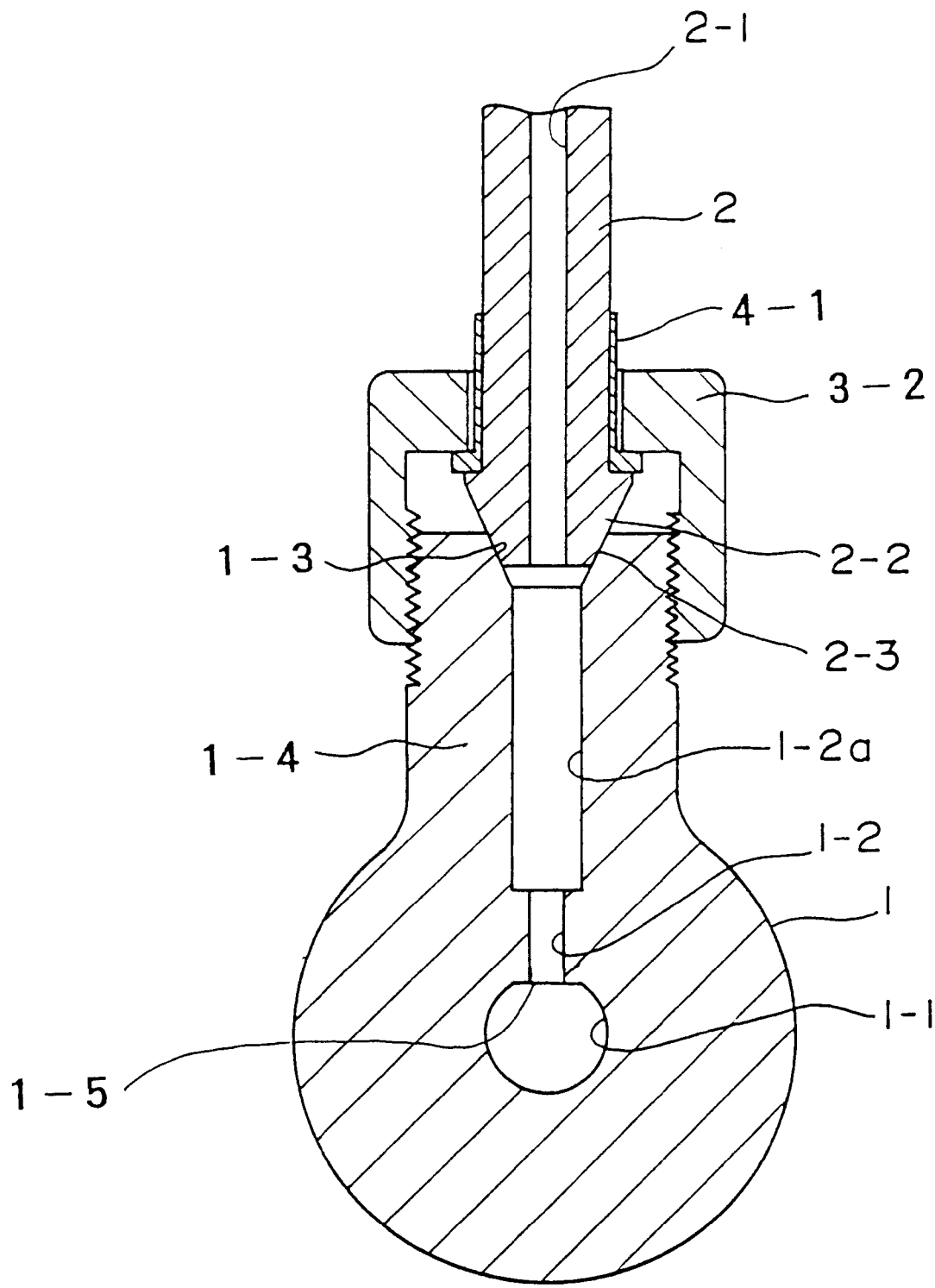
FIG. 4 is a vertical cross sectional view corresponding to FIG. 1 in the case of applying to further the other embodiment of a boss type common rail.

In this case, FIG. 4 also shows a common rail of a boss type, in this embodiment, since the pressure receiving seat surface 1-3 open to an outer direction is provided in the front end of the boss portion 1-4 serving as the integral joint portion, a branch hole 1-2a having slightly a large diameter is disposed between the branch hole 1-2 and the pressure receiving seat surface 1-3, however, the structure can be made such that the diameter of the branch hole disposed between the communication passage 1-1 and the pressure receiving seat surface 1-3 is constant.

In the case of the connection structure in accordance with this embodiment, as shown in FIG. 4, the pressing seat surface 2-3 constituted by the connection head portion 2-2 in the branch pipe 2 end is brought into contact and engaged with the pressure receiving seat surface 1-3 in the main pipe rail 1 end, and the fastening ball head lock nut 3-2 previously assembled in the branch pipe end through the sleeve 4-1 is meshed with the boss portion 1-4, thereby being fastened together with pressing of the sleeve 4-1 in the connection head portion 2-1.

Next, a common rail of a sleeve nipple type shown in FIG. 5 will be described below.

In this embodiment, the main pipe rail is constituted by a steel pipe for a high pressure piping corresponding to a material STS48 having a relatively thick pipe-like portion, for example, a diameter of 28 mm and a thickness of 9 mm, and a communication passage 1-1 is formed inside an axial core thereof. Then, in accordance with this embodiment, a cylindrical sleeve nipple 5 having a screw surface 5-1 meshed with the fastening outside screw nut 3-1 assembled in the branch pipe 2 end in an inner peripheral surface is provided in an outer peripheral wall of the main pipe rail 1 as an independent joint portion and a base end portion thereof is directly welded and mounted thereto.

In this embodiment, a method of forming the slightly projected or flattened portion 1-5 in the inner peripheral surface is constituted by fixing the main pipe rail 1 to the female mold and by applying a pressing force to the outer peripheral surface of the main pipe rail 1 on a central axial line of the sleeve nipple 5 by a punch having a diameter smaller than the inner diameter of the sleeve nipple 5 and mounted to the press apparatus. Due to the pressing force at this time, the slightly projected or flattened portion 1-5 is formed on the inner peripheral surface of the communication passage 1-1 positioned immediately below the outer peripheral surface of the main pipe rail 1 surrounded by the sleeve nipple 5.

Accordingly, the connection structure in accordance with this embodiment is made in the same manner as that of the conventional one, that is, the pressing seat surface 2-3 constituted by the connection head portion 2-2 in the branch pipe 2 end is brought into contact and engaged with the pressure receiving seat surface 1-3 in the pipe main pipe rail 1 end and the fastening outside screw nut 3-1 previously assembled in the branch pipe 2 end is meshed with the sleeve nipple 5, thereby being fastened together with pressing of the fastening outside screw nut 3-1 below the neck of the connection head portion 2-2.

Figure 6:
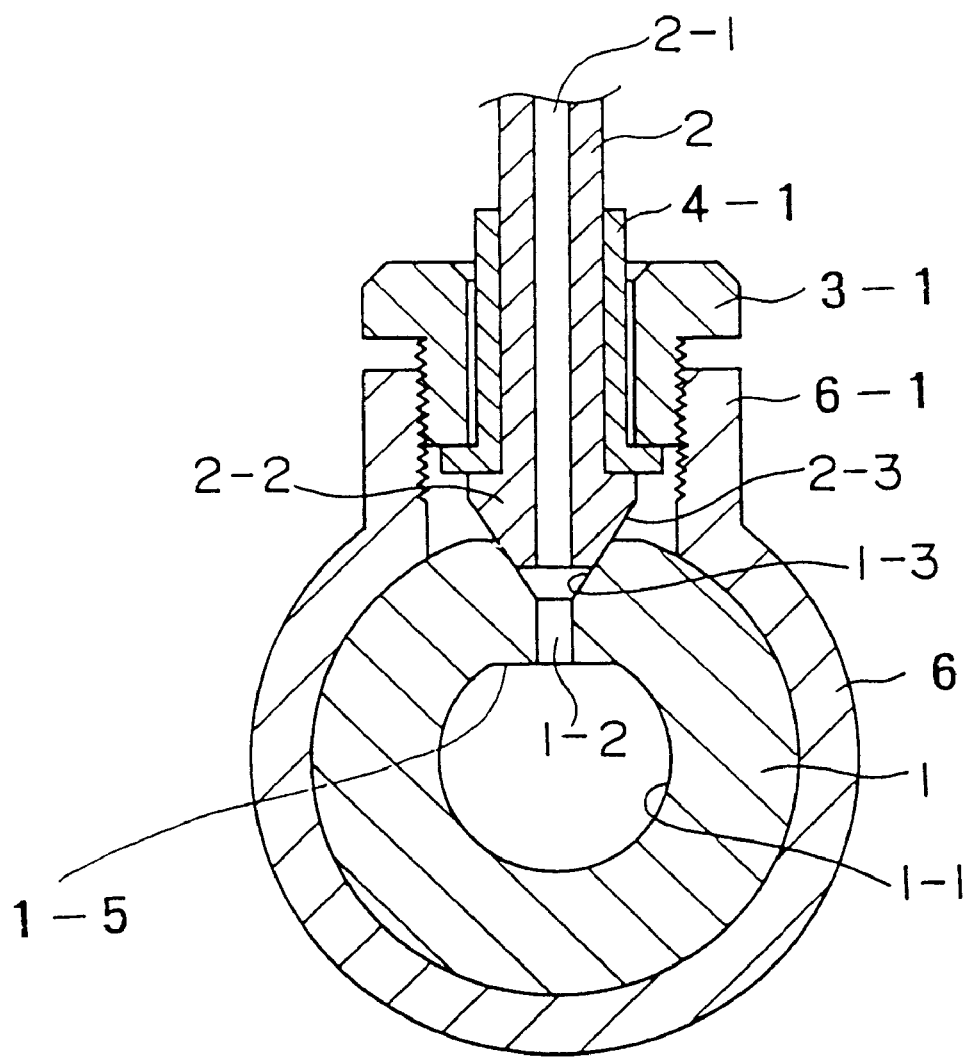
FIG. 6 is a vertical cross sectional view which partially shows an example of a connecting structure of a branch pipe in the case that the invention is applied to an embodiment of a common rail of a joint metal fitting type.

Further, a common rail of a joint metal fitting type shown in FIG. 6 will be described below.

Figure 5:
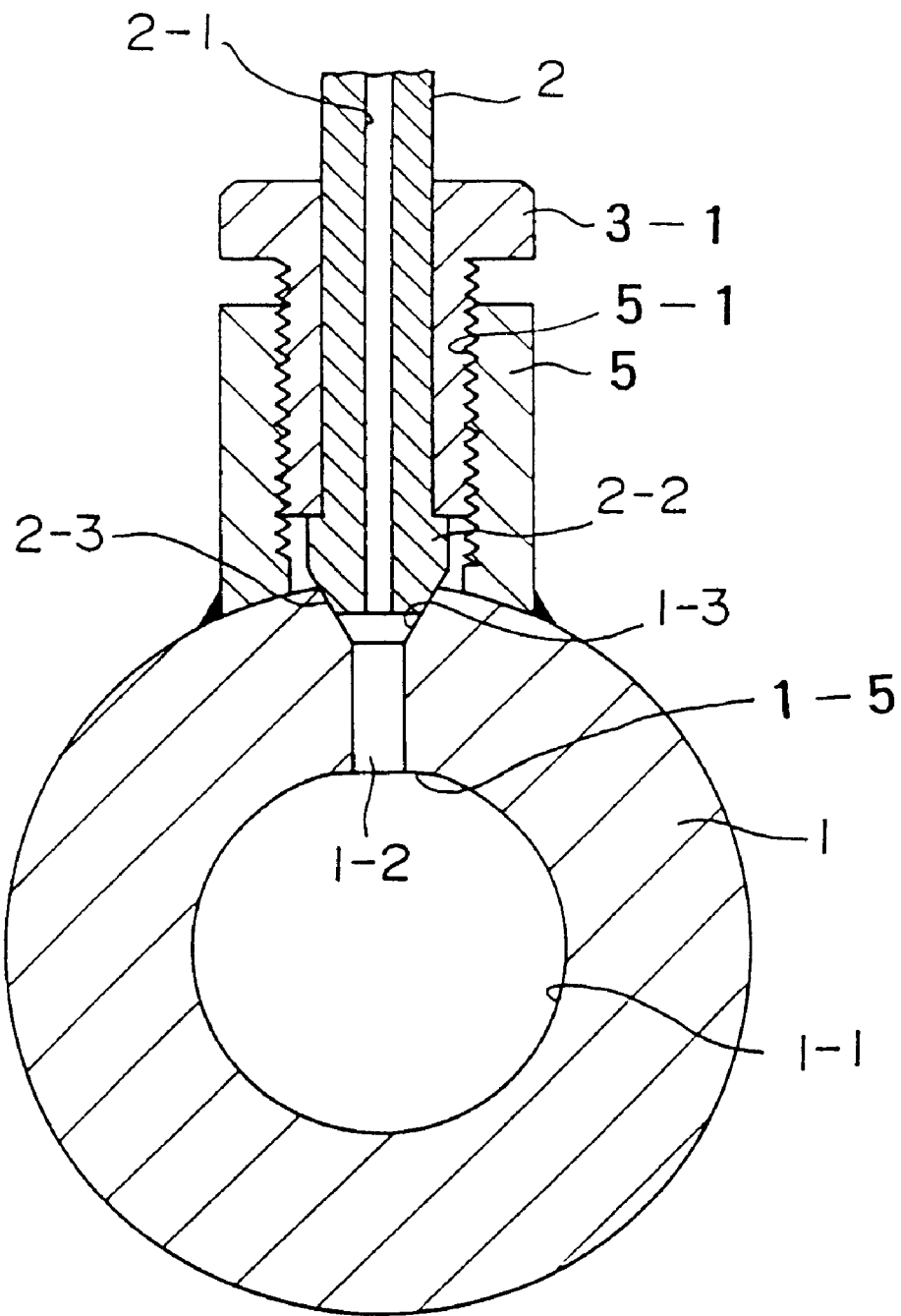
FIG. 5 is a vertical cross sectional view which partially shows an example of a connecting structure of a branch pipe in the case that the invention is applied to an embodiment of a common ail of a sleeve nipple type.

In this embodiment, a material of the main pipe rail 1 is constituted by, for example, a steel pipe for a high pressure piping corresponding to a material STS48 having a relatively thick pipe-like portion of a diameter of 28 mm and a thickness of 9 mm, as in the same manner as the embodiment in FIG. 5, and the axial core inner portion is made as the communication passage 1-1. Further, a ring-like joint metal fitting 6 having a screw wall 6-1 as an independent joint portion meshed with the fastening nut 3-1 assembled in the branch pipe 2 end on the inner peripheral surface is outwardly fitted to the outer peripheral wall of the main pipe rail 1. The connection structure is made in the same manner as that of the conventional manner, such that the pressing seat surface 2-3 constituted by the connection head portion 2-2 in the branch pipe 2 end is brought into contact and engaged with the pressure receiving seat surface 1-3 in the main pipe rail 1 and the fastening outside screw nut 3-1 previously assembled in the branching pipe end through the sleeve 4-1 is meshed with the screw wall 6-1 of the ring-like joint metal fitting 6, thereby being fastened together with pressing of the fastening outside screw nut 3-1 under the neck of the connection head portion 2-2.

In this embodiment, the slightly projected or flattened portion 1-5 can be formed on the inner peripheral surface by using a pressing force by means of the punch as in the same manner as that of the embodiment mentioned above.

In the common rail of the sleeve nipple type of the joint metal fitting type mentioned above, the slightly projected or flattened portion 1-5 can be formed all around the common rail by a broaching process or a pipe extension process.

Figure 7:
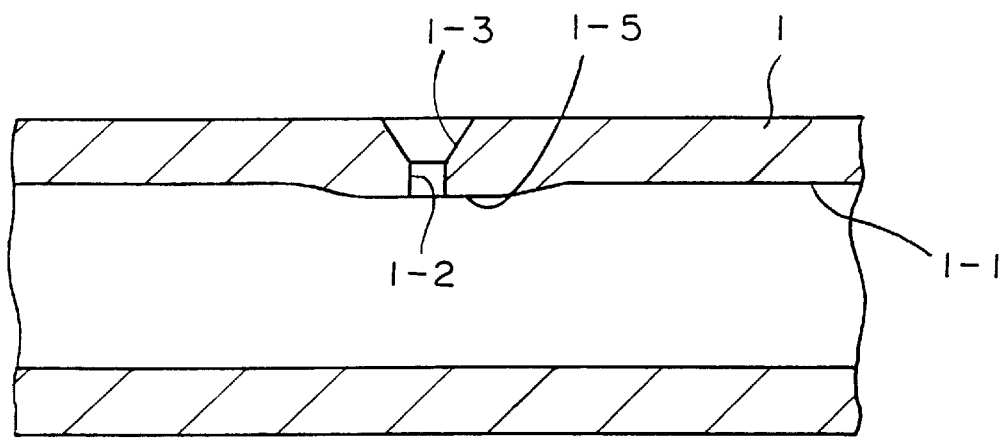
FIG. 7 is a vertical cross sectional view which shows a branch hole portion of a main pipe rail in correspondence to another embodiment in accordance with the invention.
Figure 8:
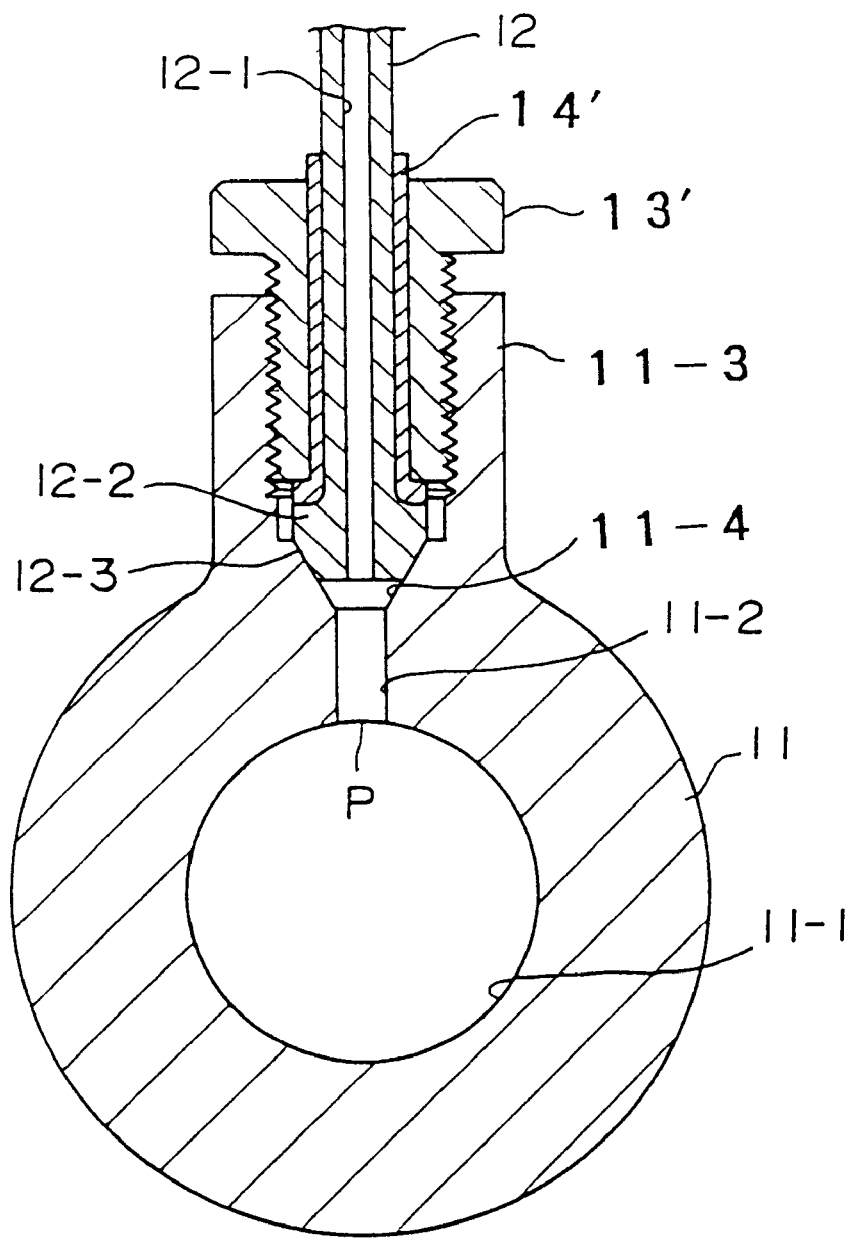
FIG. 8 is a vertical cross sectional view which shows a conventional embodiment of a common rail of a boss type.
Figure 9:
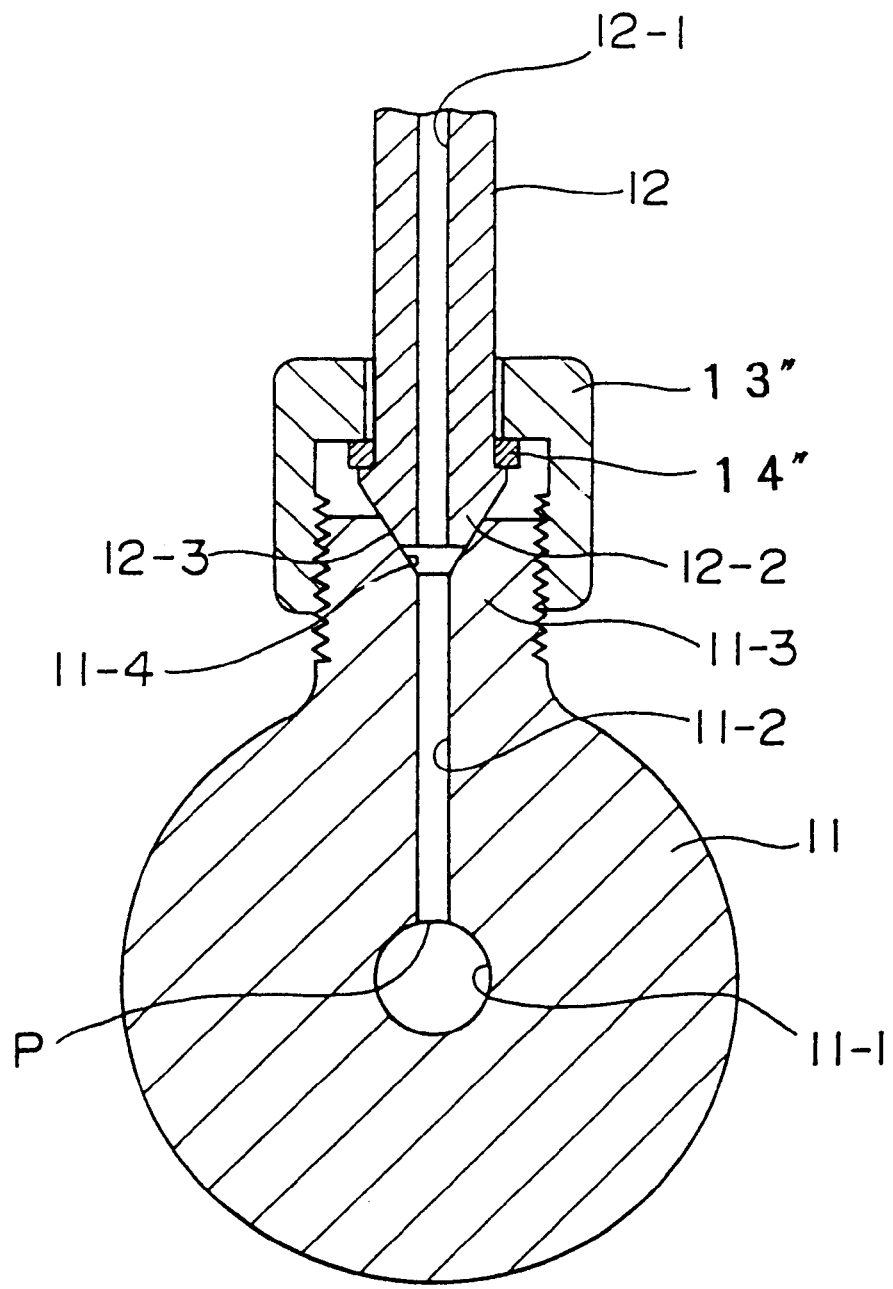
FIG. 9 is a vertical cross sectional view which shows another conventional embodiment of a common rail of a boss type.
Figure 10:
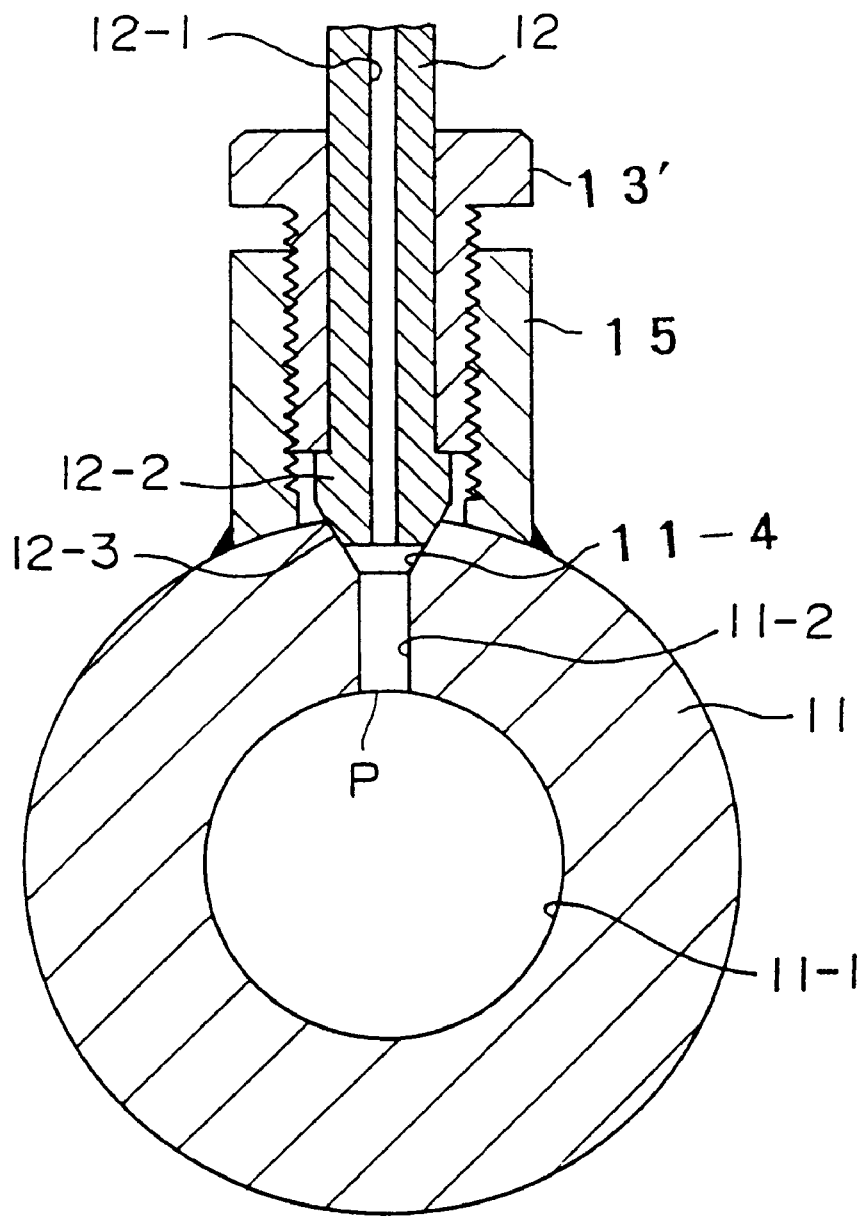
FIG. 10 is a vertical cross sectional view which shows a conventional embodiment of a common rail of a sleeve nipple type.
Figure 11:
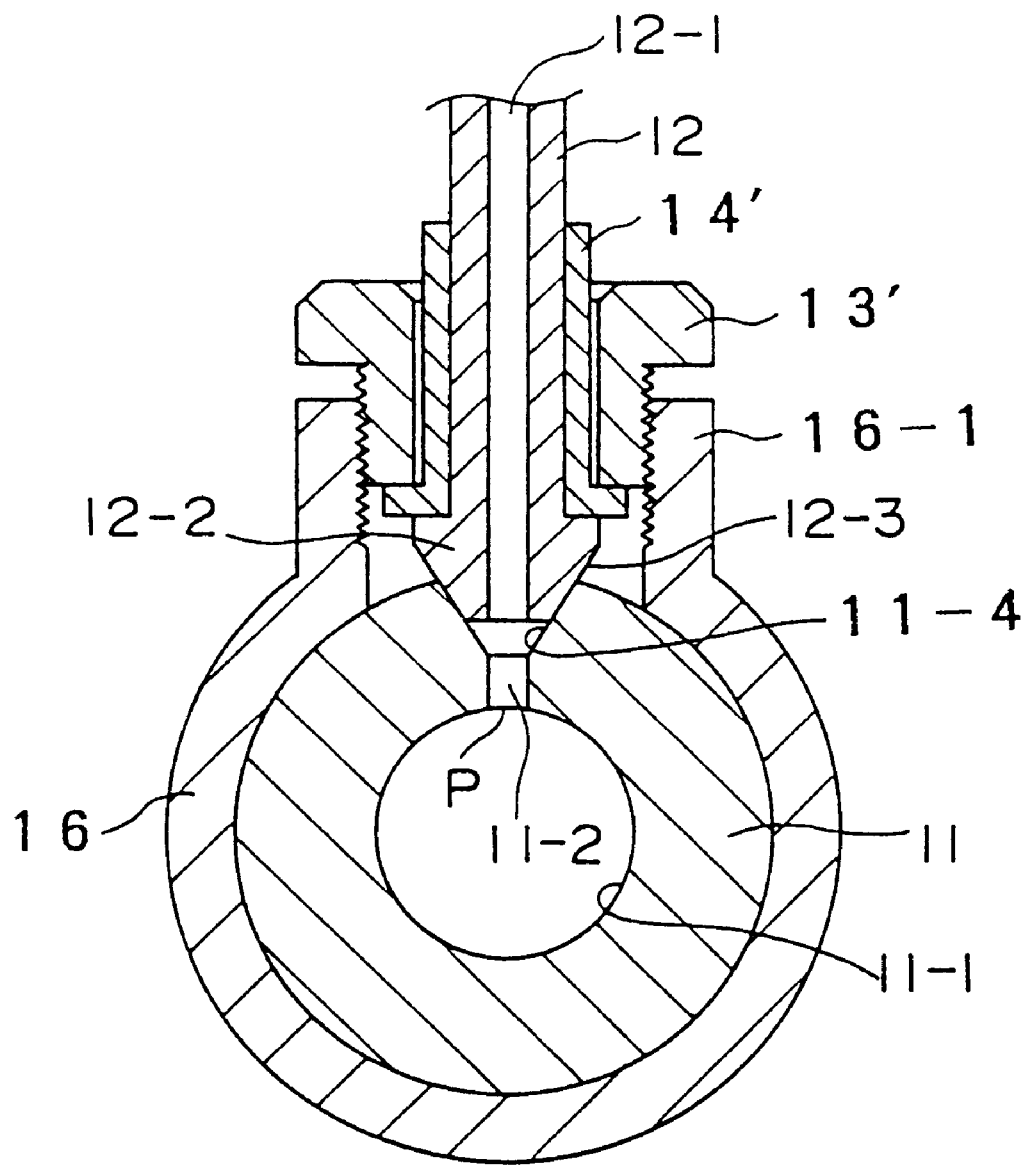
FIG. 11 is a vertical cross sectional view which shows a conventional embodiment of a common rail of a joint metal fitting type.

Next, a main pipe rail corresponding to the other embodiment in accordance with the invention as shown in FIG. 7 totally has a substantially circular cross sectional shape and the slightly projected or flattened portion 1-5 is formed only on the inner peripheral surface adjacent to the branch hole 1-2 so as to form a not circular shape in cross section. In this case, the projected or flattened portion 1-5 is provided in the branch hole 1-2 portion, and the branch hole 2 is connected by the same connection structure as that mentioned above. As means for forming the slightly projected or flattened portion 1-5 only on the inner peripheral surface adjacent to the branch hole 1-2, a plasticity processing by a roll or a press as in the same manner as that mentioned above is generally used.

As mentioned above, in accordance with the common rail of the invention, since the main pipe rail in which the outer peripheral surface is substantially formed in a circular shape and at least the inner peripheral surface adjacent to the branch hole is slightly projected or flattened so as to be formed in a vertical cross section of a not complete round shape is used, or the main pipe rail in which the total shape is formed in a vertical section of a complete round shape and only the inner peripheral surface adjacent to the branch hole is formed in a cross section of a not complete round shape is used, the stress in the lower end inner peripheral edge portion of the branch hole can be effectively prevented from generating, so that an internal pressure fatigue strength of the branch hole portion in each of the branch pipe root portions can be significantly improved. Accordingly, the common rail is excellent in durability, the fuel is prevented from leaking out due to generation of a crack, a certain and stable function can be obtained and usefulness of the common rail can be significantly improved.

What is claimed is:

1. A common rail comprising a main pipe rail having a peripheral wall with inner and outer peripheral surfaces, said inner peripheral surface being substantially cylindrically generate along a major portion of said main pipe rail and defining a main communication passage through said main pipe rail, at least one branch hole formed through said peripheral wall and extending substantially radially from the inner peripheral surface to the outer peripheral surface, portions of the branch hole adjacent the outer peripheral surface being flaired outwardly to define a pressure-receiving seat surface, a substantially tubular joint portion provided on the main pipe rail and extending substantially radially outwardly and having an axis substantially concentric with the branch hole, the joint portion being formed with an array of threads, at least one branch pipe having an end and a branch communication passage extending from the end, the end of the branch pipe defining and enlarged connection head portion having a pressing seat surface adjacent the end and having a neck facing from the end, the branch pipe being disposed substantially concentrically within the tubular point portion such that the pressing seat surface of the branch pipe is engaged with the pressure-receiving seat surface of the branch hole and such that the branch communication passage of the branch pipe is substantially axially aligned with the branch hole of the main pipe rail, a nut engage over portions of the branch pipe adjacent the enlarged connection head portion thereof, the nut having an array of threads engaged with the threads of the joint portion, the nut further having an end engaged with the neck portion of the branch pipe for tightly urging the pressing seat surface of branch pipe against the pressure-receiving seat surface of the main pipe rail, wherein portions of the inner peripheral surface of the main pipe rail surrounding the branch hole are flatted, the flatted portion of the inner peripheral surface intersecting the substantially cylindrical generated portions of the inner peripheral surface.

2. A common rail as recited in claim 1, wherein said flattened portion of the inner peripheral surface of said main communication passage is a chordal surface radially offset from the cylindrically generated inner peripheral surface existing elsewhere on the main pipe rail by a distance of 0.05 to 1.0 mm.

3. A common rail as recited in claim 1, wherein said flattened portion of the inner peripheral surface of said main communication passage is a chordal surface radially offset from the cylindrically generated inner peripheral surface existing elsewhere on the main pipe rail by a distance of 1.0 to 2.0 mm.

4. A common rail as recited in claim 1, wherein said flattened portion is formed by a press molding the outer peripheral surface of the main pipe rail from an outer direction in a diametrical direction of the main pipe rail.

5. A common rail as recited in claim 1, wherein said joint portion is constituted by a boss integrally formed with the main pipe rail.

6. A common rail as recited in claim 1, wherein said joint portion is constituted by a sleeve nipple fixed to said main pipe rail.

7. A common rail as recited in claim 1, wherein said joint portion is constituted by a joint metal fitting surrounding said main pipe rail.

8. A common rail as recited in claim 7, wherein said flattened portion is formed all around said inner peripheral surface by a broaching process.

\* \* \* \* \*

UNITED STATES PATENT AND TRADEMARK OFFICE
Certificate

Patent No. 6,050,611                                                  Patented: April 18, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kikuo Asada, Mishima, Japan; and Masayoshi Usui, Numazu, Japan.

Signed and Sealed this Third Day of December 2002.

LYNNE H. BROWNE
*Supervisory Patent Examiner*
Art Unit 3679